United States Patent [19]

Frank

[11] 4,387,844
[45] Jun. 14, 1983

[54] METHOD AND APPARATUS FOR RADIAL INERTIA WELDING OF DISSIMILAR METALS

[75] Inventor: Everett S. Frank, Waterloo, Iowa

[73] Assignee: The United States of America as represented by the Secretary of the Army, Washington, D.C.

[21] Appl. No.: 269,139

[22] Filed: Jun. 1, 1981

[51] Int. Cl.³ .............................................. B23K 20/12
[52] U.S. Cl. ......................................... 228/113; 228/2
[58] Field of Search ..................... 228/2, 112, 113, 114

[56] References Cited

U.S. PATENT DOCUMENTS

| | | | |
|---|---|---|---|
| 3,606,968 | 9/1971 | Loyd | 228/2 |
| 3,625,528 | 12/1971 | Sage | 228/2 X |
| 3,934,780 | 1/1976 | Flax | 228/2 |
| 4,063,676 | 12/1977 | Lilly | 228/2 X |

*Primary Examiner*—Kenneth J. Ramsey
*Attorney, Agent, or Firm*—Nathan Edelberg; Robert P. Gibson; Max Yarmovsky

[57] ABSTRACT

The invention discloses an apparatus for the radial inertia welding of a metal band to the outer surface of a cylindrical metallic structure. The metals may be similar or dissimilar. The band is placed on the inside of a spinning collet and as the cylindrical structure is advanced thru the band, at a predetermined position, it activates the collet jaws, causing the band to be radially compressed onto the cylindrical structure. Friction between the rotating band and the cylindrical structure held by a tailstock creates heat and under the resulting collet jaw pressure welding action results.

8 Claims, 1 Drawing Figure

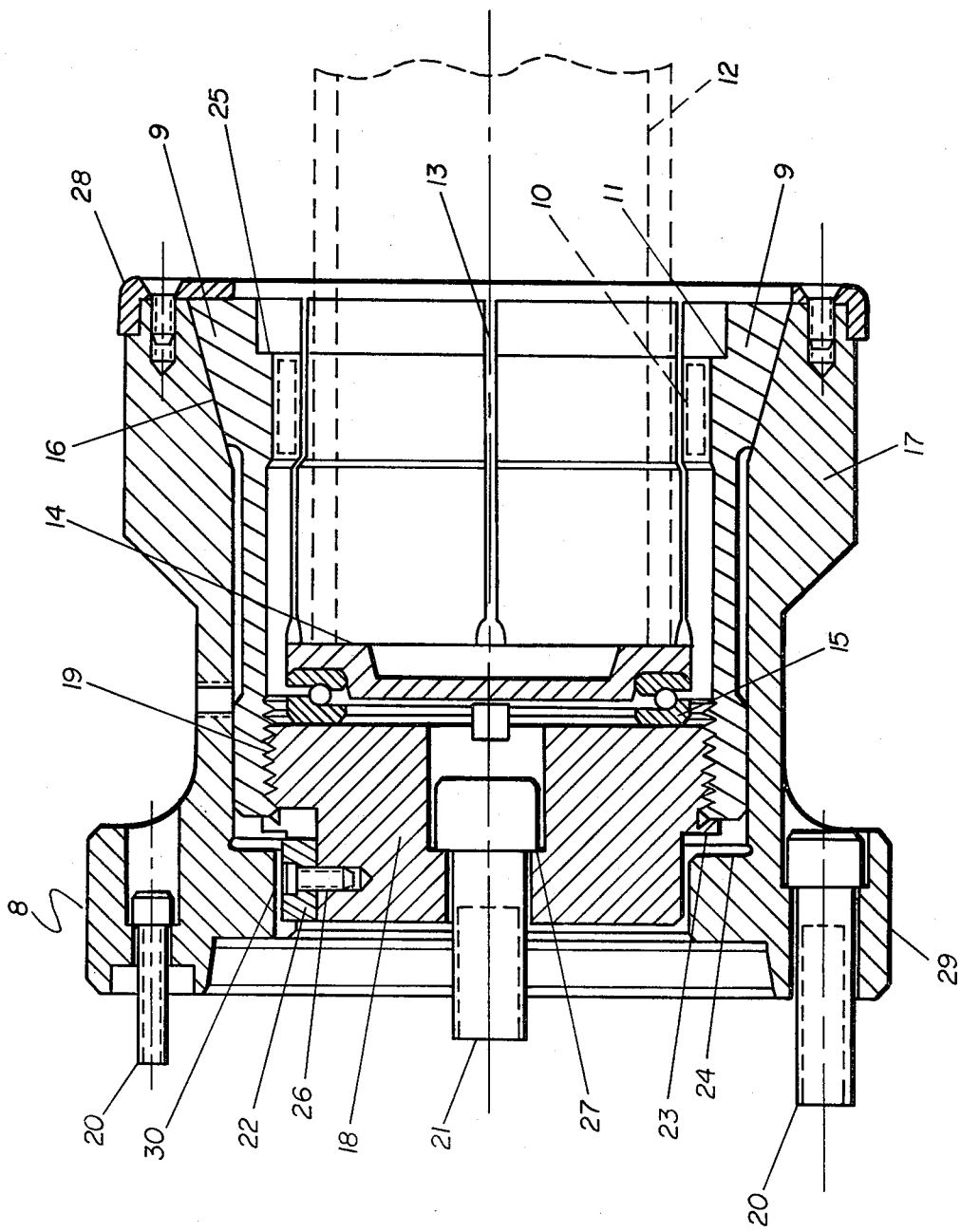

METHOD AND APPARATUS FOR RADIAL INERTIA WELDING OF DISSIMILAR METALS

GOVERNMENTAL INTEREST

The invention described herein was made in the course of a contract with the Government and may be manufactured, used and licensed by or for the Government for Government purposes without the payment to me of any royalties thereon.

BACKGROUND OF THE INVENTION

This invention deals with the problem of assembling a metallic band onto the outer surface of a cylindrical metal structure. The metals may be similar or dissimilar. This problem is commonly encountered in the manufacture of munitions where a gilding metal rotating band must be attached to the projectile casing at a specific location.

Heretofore only three methods existed for assembling copper, brass, gilding metal or sintered metal rotating bands to projectiles. These methods were: (1) pressing the band radially into a band seat with a special multi-jaw press, (2) continuous overlay welding of the heliarc or plasma arc types, and (3) swaging with a special press through a special swage die. Problems existed with methods (1) and (3) on thin-wall projectiles. Primarily, sidewall collapse occurred too frequently and secondarily the rotating bands were discarded when subjected to higher than normal ballistic stresses extant in the Army's new gun/propellant systems. Method (2) provided a ballistically sound structure but is a very slow manufacturing process. A faster, more economical means was required to assemble rotating bands onto projectile casings.

Earlier attempts at inertial welding of rotating bands had failed. In one method, the band was placed on the projectile casing and restrained from axial displacement by a spacer. This assembly was fixed in a tailstock. A high speed rotating tapered sleeve or collet was then forced onto the band to effect the weld. This method was found inadequate for several reasons, chief among those were: (1) the gilding metal on the rotating band often showed a tendency to be squirted ahead of the taper of the collet and (2) the band edge on the high side of the taper often did not become bonded to the projectile casing because there was not sufficient force available to compress the band evenly across its width.

SUMMARY OF THE INVENTION

The present invention includes radial inertia welding apparatus that avoids the prior art problems. The apparatus comprises a spinning collet in which the band is placed. As the cylindrical structure such as a shell casing is rapidly advanced through the collet it causes longitudinal movement of the collet relative to the supporting housing ring. Inclined surfaces between the collet jaws and the housing ring cause the collet jaws to deflect radially inward, pressing the band against the the cylindrical structure, resulting in a welding action.

BRIEF DESCRIPTION OF THE DRAWING

The drawing shows a cross-sectional view of a spinning collect assembly as used for radial inertia welding.

DESCRIPTION OF PREFERRED EMBODIMENT

The drawing is a cross-sectional assembly view of a headstock collet assembly 8, attached to headstock, which holds, locates and compresses a metal rotating band 10 onto a projectile casing 12. The band blank 10 is placed in the open collet 11 while the casing 12 is held in a separate tailstock collet of a conventional slip ring design and which is not a part of this invention. Multiple longitudinal slits 13 in the front end of the collet create collet jaws 9 that initially support and subsequently compress the band 10. The inertia welding machine tailstock is advanced until the casing passes through the band blank 10 and encounters the front race 14 of the thrust bearing assembly 15. At this point the band blank 10 is located properly with relation to the casing where inertia welding will occur. Internal flange 25 supports and aids in the axial location of the band 10. With slight pressure on the front race 14, the inclined surfaces 16, which are segments of a truncated cone, act to deflect the collet jaws 9 radially inward onto the band blank 10, holding it in place while the headstock is activated to reach a high rotational rate. The collet 11 is pulled through a headstock collet ring housing 17 by the actuating means or flange 18 since it is threadably connected to the rear end of collet 9 at 19. The axial movement is limited to the space between the flange shoulder 23 of flange 18 and the inward flange shoulder 24 of housing ring 17. Bolts 20 in outward flange 29 are used to mount the entire assembly 8 to headstock while bolt 21 in countersunk bolt hole 27 in flange 18, also attached to the headstock, determines the retracted limit of movement of actuating means 18. The retracted limit may also be controlled by cap 28 attached to face of housing 17. To prevent rotation of flange 18, possibly induced by the thrust bearing 15, the rear end of housing 17 includes a keyway 30 and element 22, attached to the flange 18 with bolt 26, keys the flange 18 to the housing ring 17. The collet assembly 8 with the band 10 is rotated at high rpm and free-wheels once the desired rotational rate is reached. The front race 14 of the thrust bearing 15 remains stationary, restrained by casing 12. At the selected rotational rate, the machine is programmed to advance the tailstock holding the casing 12 against the front race 14 at a rate, for example, of 5 inches/second with a force of 192,000 pounds. This advance rate and force are for one particular application only. Activation of the thrust bearing closes the collet jaws rapidly, causing the band blank 10 to compress onto the casing 12. Friction between the band blank 10 and the casing 12 causes heat and with the accompanying pressure—a welding action results. The band blank 10 then seizes onto the casing 12. Free wheeling rotation stops when all energy in the system is absorbed by the welding action.

A timer, not shown, in the machine signals the tailstock to retract, releasing pressure on the thrust bearing assembly 15, and causing the headstock collet jaws 9 to open. As the tailstock retracts, the banded casing is extracted from the headstock collet assembly 8 to the load/unload position of the tailstock. Both headstock and tailstock collets now are ready for reloading of their respective parts to repeat the cycle. It will be apparent that this unique collet design results in a mechanism which allows radial inertia welding 90° to the centerline of the cylindrical parts, an advancement in the state-of-the-art.

Accordingly, while there have been shown and described the preferred embodiments of the present invention, it will be understood that the invention may be embodied otherwise than as herein specifically illustrated or described and that within said embodiments certain changes in the detail and construction, and the form of arrangement of the parts may be made without departing from the underlying idea or principles of this invention within the scope of the appended claims.

I claim:

1. A headstock collet assembly for radial inertia welding of two cylindrical metallic elements, which comprises:
   (a) a collet having a rear end with threaded means and a front end with jaws;
   (b) an operator flange having a rearwardly facing shoulder, a forward external cylindrical surface portion threaded into the rear end of the collet, a key attached to the external cylindrical surface rearwardly of the collet, a centered countersunk bolt hole, including a bolt to attach the flange to a headstock;
   (c) a thrust bearing located inside the collet, having a back race attached to a face of the flange and a front race facing the front end of the collet;
   (d) a collet housing ring inside of which is placed the threadably connected flange and collet, the end away from the collet jaws having an outward flange with bolt holes for attachment of the housing ring and therefore the entire collet assembly to the headstock, an inward flange at the same end forming a seat opposite said shoulder on the flange, a key way for engaging the key attached to the flange; and
   (e) means intermediate the external surface of the collet jaws and the internal surface of the housing ring for causing the collet jaws to move radially inward as the headstock assembly is rotating and a rotationally fixed axial force is pressed against the front race of the thrust bearing, causing the operator flange to pull the collet inward of the housing ring.

2. The headstock collet assembly as described in claim 1 wherein the means for causing the collet jaws to move radially inward is a truncated cone formed on the external surface of the collet and on the internal surface of the housing ring.

3. The headstock collet assembly as described in claim 1 wherein the interior surface of the collet jaws includes a flange for axially locating a band in the collet.

4. The headstock collet assembly as described in claim 1 wherein the maximum axial distance the collet can move inward of the housing ring is determined by the space between the housing ring seat and the flange shoulder.

5. The headstock collet assembly as described in claim 1 wherein the retracted position of the collet in the housing ring is determined by said bolt centered in the flange.

6. The headstock collet assembly as described in claim 1 wherein the retracted position of the collet in the housing ring is determined by a cap attached to the housing ring and overlapping a portion of the front end of the collet jaws.

7. A headstock collet assembly for radial inertia welding of two cylindrical metallic elements, which comprises:
   (a) a collet having an internally threaded rear end and a front end having jaws therein, a portion of the external surface of the jaws forming a truncated cone with the large diameter at the front end of the collet;
   (b) a flange having a threaded portion threadably engaging the threaded rear end of the collet, a key attached to an external cylindrical surface of the flange rearwardly of the collet, a centered countersunk bolt hole, including a bolt to attach the flange to a headstock, a shoulder facing in the direction of the headstock;
   (c) a thrust bearing located inside the collet, having the back race attached to a face of the flange and the front race facing the jaw end of the collet; and
   (d) a collet housing ring inside of which is placed the threadably attached flange and collet, the end away from the collet jaws having an outward flange with bolt holes for attachment of the housing ring and therefore the entire collet assembly to the headstock, an inward flange at the same end forming a seat opposite the shoulder on the flange, a key way for engaging the key attached to the flange, a portion of the interior surface adjacent to the face of the collet jaws forming a truncated cone, complementing the truncated cone exterior surface of the collet jaws;
   whereby as the assembly is rotating, when attached to the headstock, a rotationally fixed axial force against the front race of the thrust bearing will cause the collet jaws to move radially inward.

8. A method for radial inertia welding of two cylindrical metallic elements which comprises:
   (a) assembling a collet inside a ring housing;
   (b) rotatably attaching the collet and ring housing assembly to a headstock;
   (c) placing a first cylindrical element inside the jaws of the collet;
   (d) mounting a rotationally fixed second cylindrical element to a tailstock;
   (e) rotating the collet and ring assembly to a predetermined speed and allowing it to free-wheel;
   (f) rapidly advancing the second cylindrical element through the first element while the collet and ring housing assembly is free-wheeling at the predetermined rate of speed; and
   (g) activating a means causing the collet jaws to move radially inwardly compressing the first cylindrical element onto the second cylindrical element, resulting in a radial inertia welding action.

* * * * *